March 31, 1953 M. G. LEESON 2,633,004
ICE MAKER
Filed March 26, 1949 2 SHEETS—SHEET 2

INVENTOR
Meldon Gerald Leeson
BY
Curtis, Morris + Safford
ATTORNEYS

Patented Mar. 31, 1953

2,633,004

UNITED STATES PATENT OFFICE 2,633,004

ICE MAKER

Meldon Gerald Leeson, York, Pa., assignor to Flakice Corporation, Brooklyn, N. Y., a corporation of Delaware Application March 26, 1949, Serial No. 83,603

8 Claims. (Cl. 62—7)

1

This invention relates to congealing liquids, and more in particular to methods and apparatus for freezing ice in such a manner as to insure uniform high quality under varying conditions of operation. The present application is related to my copending applications Serial No. 573,939, filed January 22, 1945, now Patent No. 2,524,815, and Serial No. 686,021, filed July 21, 1946, now Patent No. 2,549,747; and also, to copending application Serial No. 57,158, filed October 29, 1948, now Patent No. 2,593,874.

The above-identified copending applications disclose ice-making units of the "package type," which are manufactured on a mass production basis, and are sold and installed throughout the country. Under normal circumstances, the installation of one of these units involves its connection to an electrical power source to operate the electric motors, and its connection to a source of water such, for example, as the city mains; and, there is a drain connection. The characteristics of the water available vary greatly throughout the country, particularly in "hardness," that is, in the content of dissolved solids, such as, calcium and magnesium salts.

These salts may be distinguished as "temporary hardness" or "encrusting solids" which are calcium carbonate and magnesium carbonate, and "permanent hardness" or "non-encrusting solids," which are the remaining salts.

A high content of either type of these salts interferes with the production of high quality ice because it causes the ice to be opaque or cloudy. The concentration of encrusting solids which may be present without danger of producing cloudy ice is relatively low; and, in fact, is of the order of six hundred parts per million; the corresponding permissible concentration of non-encrusting solids is twelve hundred parts per million. For water from any particular source, the concentration of each of these types of salts is fairly constant, and, therefore, the difficulties caused by their presence may be overcome by treating the water to remove the particular salts. However, water treating equipment is expensive to install and operate, and it is apt to be troublesome.

It is an object of the present invention to provide for the manufacture of ice with equipment such as that referred to above with complete assurance that high quality ice will be produced. It is a further object to provide ice-making units of the above character which will operate with utmost efficiency at all times, and which are adaptable to various conditions of the water and to varying demands in use.

2

It is a further object to produce ice of high quality even though the water which is available contains relatively large amounts of dissolved solids. It is a still further object to provide a simple method of controlling the making of ice in such a way that the quantity of ice produced can be sacrificed to produce high quality ice when such is desirable, and yet to provide for maximum ice output. It is a further object to provide a method and apparatus for freezing substantially pure water from a supply which contains dissolved solids, and further to provide for a careful control of the concentration of the solids in the water being frozen. It is a further object to provide methods and apparatus of the above character which are easily adaptable to a wide variety of conditions of use and operation, and which avoid the necessity for attention by specially trained technicians. It is a still further object of the present invention to provide automatic control for the salt concentration in water which is being frozen without the necessity for expensive water-treating apparatus. It is a further object to provide apparatus of the above character which is simple and sturdy in construction, inexpensive to manufacture and maintain, and efficient and dependable in use. These and other objects will be in part obvious and in part pointed out below.

The invention, accordingly, consists in the features of construction, combinations of elements, arrangements of parts and in the several steps and relation and order of each of the same to one or more of the others, all as will be illustratively described herein, and the scope of the application of which will be indicated in the following claims.

Figure 1:
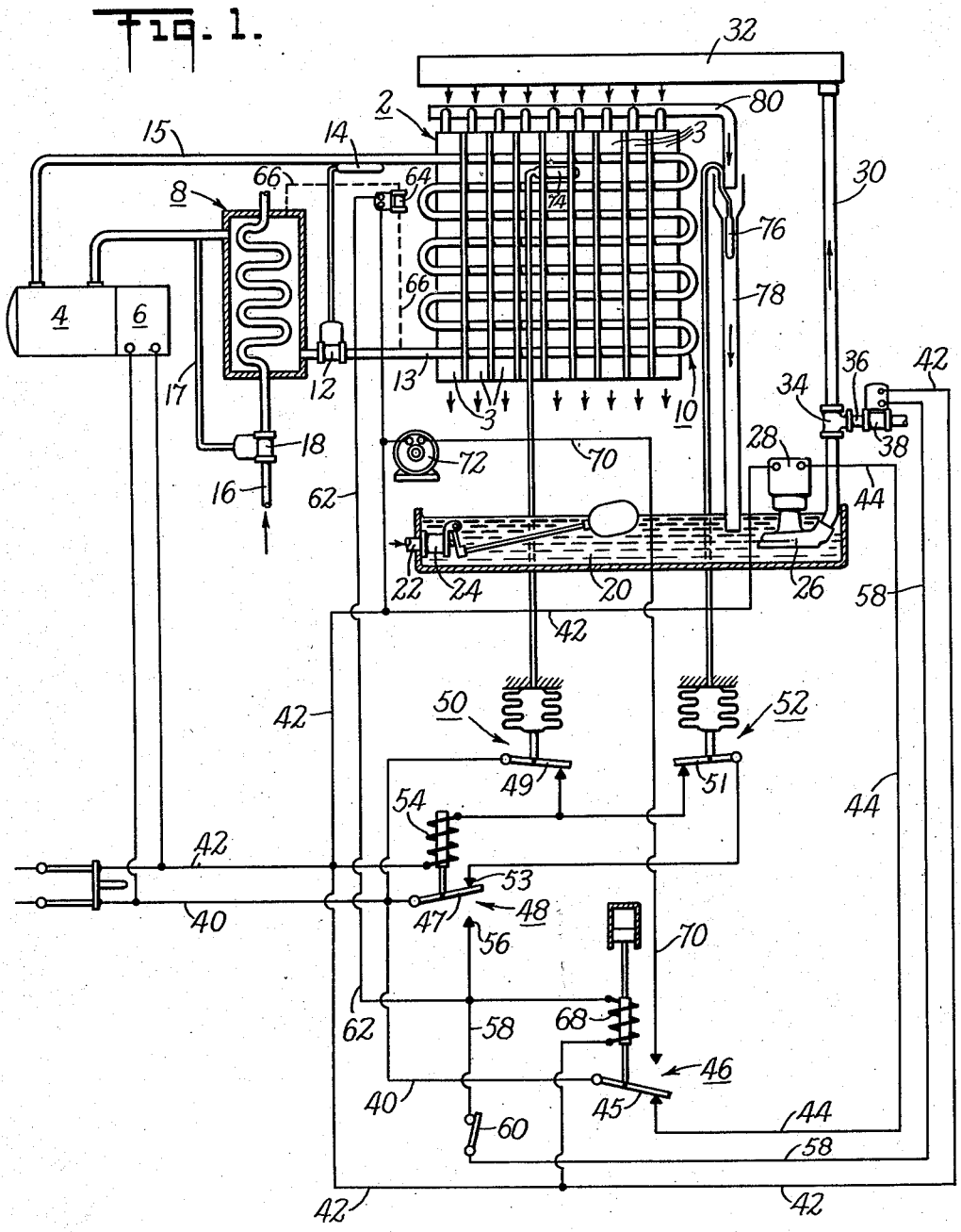
Figure 1 is a schematic showing of one embodiment of the invention.

In the illustrative embodiments of the present invention, the ice-making apparatus is of the character disclosed in the above-mentioned copending applications. Feed water is delivered into a sump from which it is pumped to a bank of freezing tubes. The water flows down through these tubes and part of it is frozen into clear, hard ice, while the remainder of the water returns to the sump by gravity and is recirculated. As the water freezes, there is a tendency for the dissolved solids to be excluded from the ice, and they remain in the water returning to the sump. Thus, there is a tendency for the concentration of dissolved solids to build up in the sump, and, in practice, this concentration is apt to be of the order of twelve times the concentration of dissolved solids in the feed water. It has been pointed out above that concentrations of encrusting and non-encrusting solids, respectively, of the order of six hundred and twelve hundred parts per million in the water being frozen, may cause cloudy ice to be produced. Therefore, for practical purposes, with units such as those referred to above, dissolved solids in the feed water of the order of one-twelfth these values, that is, fifty and one hundred, respectively, are apt to cause cloudy ice, if steps are not taken to overcome the difficulty.

In accordance with the present invention, these difficulties are overcome by withdrawing water from the sump so as to withdraw some of the water of increased concentrations of dissolved solids and this water is discharged to the drain. Either simultaneously with, or immediately following this withdrawal of water from the sump, there is additional feed water added, and this reduces the concentrations of dissolved solids in the remaining water. A sufficient amount of water is withdrawn to insure that the concentrations of dissolved solids never reach values which are apt to cause difficulties. In other words, the concentrations of dissolved solids are kept within the permissible limits by freezing less than one hundred per cent of the water, and by discharging the remaining portion of the water to the drain. With this arrangement, an equilibrium condition is reached, wherein sufficient dissolved solids are discharged from the sump to equal the excess of such solids being added by the feed water.

With the illustrative embodiments of the invention, ice is produced in accordance with predetermined cycles, each comprising a freezing operation and a harvesting operation, and for any particular set of operating conditions, a predetermined amount of ice is produced during each cycle. In one embodiment, water is withdrawn from the sump intermittently, with there being a predetermined quantity withdrawn during each harvesting operation. Thus, during the freezing operation, the concentration of dissolved solids tends to build up, and then, during the harvesting operation, these concentrations are reduced again by withdrawing water from the sump, and replacing it with feed water.

In another embodiment of the invention, water is withdrawn from the sump during the freezing operation by merely bleeding off a portion of the water which is being pumped to the top of the freezing tubes. With either embodiment, the concentrations of solids in the water in the sump may be varied by increasing or decreasing the amount of water which is withdrawn during each cycle of operation. In practice, it is desirable to withdraw a minimum amount of water, not only because of the loss of the water, but also because of the relative efficiency of the ice-making unit being reduced by the withdrawing of an excessive amount of water. Thus, when the unit is installed, the unit is tested in one manner or another and, depending upon the concentrations of dissolved solids in the feed water, the operator determines if there is danger of cloudy ice being formed; if so, he determines the amount of water which must be withdrawn during each cycle of operation in order to insure that ice of the desired quality will be produced. The water withdrawing mechanism is adjusted accordingly, and except when there is an increase of the concentrations of dissolved solvents in the feed water, the unit produces ice of exceptionally high quality, without further adjustment.

However, as indicated above, this reduces somewhat the rate of production of ice, and there may be occasions when the operator wishes to produce a maximum amount of ice, even though it is not of the usual high quality. Therefore, the present invention contemplates the rendering ineffective of the water withdrawing mechanism whenever the operator wishes to produce a maximum amount of ice. Therefore, in accordance with one mode of operation, a predetermined amount of water is withdrawn from the sump and discharged to the drain during each cycle of normal operation, but the operator then renders the water withdrawing mechanism ineffective when exceptional circumstances make it desirable to increase the rate of ice production.

In describing the illustrative embodiments of the present invention, only those details are discussed which are pertinent to the understanding of the present invention, and reference may be made to the above-mentioned copending applications for more detailed discussions of the various features of construction.

Referring particularly to Figure 1 of the drawings, a bank 2 of freezing tubes 3 is cooled by a refrigerant system, which is represented schematically and which comprises, a compressor 4 driven by an electric motor 6, a water-cooled condenser 8 (which also acts as a receiver), and an evaporator 10 which is formed by two parallel tube sections (only one of which is shown) positioned on the opposite sides of the bank of freezing tubes. An expansion valve 12 is in a pipe 13 connecting the condenser to the evaporator, and this valve is controlled by a bulb 14 positioned on the gas return pipe 15 extending from the evaporator to the compressor. Water to condense the refrigerant is supplied from a source of feed water and flows through a pipe 16 and is discharged to a drain. Pipe 16 has a valve 18 therein which is controlled by the refrigerant pressure in the condenser transmitted through a pressure tube 17. The arrangement is such that the water flow is increased whenever the condenser pressure rises so that water is supplied to the condenser in sufficient quantity at all times to condense the refrigerant and maintain the desired condenser pressure.

Water to be frozen is supplied to a sump tank 20 through a pipe 22 under the control of a float valve 24 which maintains a predetermined water level in the tank. At the right-hand end of tank 20, a centrifugal pump 26, driven by an electric motor 28, pumps water upwardly through a pipe 30 to a header 32. From header 32 the water is directed downwardly by a plurality of nipples into the tops of tubes 3 so as to cover the inner surfaces of the tubes with fast moving sheets or streams of the water. Tubes 3 are cooled sufficiently during the freezing cycle to freeze some of the water on the inner surfaces of the tubes, and the rate of flow of the water is sufficiently rapid to cause clear, hard ice of high quality to be formed. Water is supplied to the tubes in an amount which is in excess of the amount which is frozen, and the excess returns to the sump tank 20 for recirculation.

Pipe 30 has a T-connection 34 therein, at which a water discharge (or drain) pipe 36 is connected. Pipe 36 has a solenoid valve 38 therein which is normally closed, but which is opened by energization of its solenoid. As is explained in detail in the copending applications referred to above, ice is produced by this apparatus in accordance with a predetermined cycle of operations. The cycle is started by starting pump 26 and compressor 4 so that tubes 3 are cooled as water flows through them and ice is formed therein. When ice of the desired thickness has been formed, the freezing operation is discontinued and the ice is harvested. In this embodiment the freezing operation is continued until ice fills substantially the entire space within the tubes, and the ice columns or bodies have only small cylindrical openings therethrough. The ice harvesting operation is performed by supplying hot refrigerant gas to the evaporator, all in a manner to be more fully described below.

The electrical circuit is represented schematically in Figure 1, and will now be described in detail.

Motor 6 is connected directly to a pair of lines 40 and 42 which constitute a supply of electric power, and motor 28 of pump 26 is connected at one side to line 42, and at the other side through a line 44 and the armature 45 of a time-delay relay switch to line 40. Line 40 is also connected to the armature 47 of a relay switch 48 and to the armature 49 of a normally closed thermostatic relay 50. The other side of relay 50 is connected to one side of a thermostatic relay 52 having an armature 51, and also to one side to the solenoid 54 of relay 48. The other side of relay 52 is connected to the upper contact 53 of relay 48. Relay 48 has a lower contact 56 which is connected through a line 58 having a normally closed manual switch 60 therein to one side of the solenoid of valve 38. The other side of this solenoid is connected to line 42.

Contact 56 is also conected through a line 62 to the solenoid of a valve 64; the other side of this solenoid is connected to line 42. Valve 64 is in a bypass pipe 66 which extends between the top of the condenser 8 and evaporator 10. Valve 64 is normally closed, but when its solenoid is energized, the valve is opened so as to provide for free passage of hot gas from the condenser receiver to the evaporator, and this initiates the harvesting operation by freeing the ice.

Contact 56 of relay 48 is also connected to one side of solenoid 68 of relay 46, the other side of which is connected to line 42. The lower contact of relay 46 is connected to motor 28, and the upper contact is connected through a line 70 to an ice cutter or breaker motor 72, the other side of which is connected to line 42. The bulb 74 of thermostatic relay 50 is positioned in heat exchange relationship with evaporator 10 and this relay is so adjusted that its switch is opened when the evaporator temperature falls below 32° F. The thermostatic relay 52 has its bulb 76 positioned in the upper end of a tube 78 which has a funnel-like top portion and which extends at its lower end to sump tank 20. The upper end of tube 78 receives the outlet end of a header pipe 80 which is connected to the upper end of each of the freezing tubes 3. The switch of relay 52 remains closed at normal ambient temperatures, but it opens whenever its bulb temperature is reduced to 44° F.

During the freezing operation, ice builds up on the inner surfaces of the freezing tubes so as to form hollow columns or bodies of ice. Water is supplied to each of these tubes at a fairly rapid rate, and it flows freely down through the center of the ice formation. However, as the end of a freezing or ice-making operation is approached the size of the hole through each of the ice bodies is reduced sufficiently to tend to restrict the water flow, and the water tends to back up at the top of the freezing tube. The arrangement is such that when the flow of water through any freezing tube is materially interfered with, then the water is diverted into the header tube 80 and it flows down onto bulb 76 in pipe 78 and returns to the sump. This reduces the temperature of bulb 76 very rapidly from the ambient temperature to the temperature of the water which is in the neighborhood of 32° F., and this causes the switch of relay 52 to open.

Assuming that the apparatus has just started a freezing operation, with motor 6 driving compressor 4 and motor 28 driving the water pump 26, the evaporator is still at a relatively high temperature, and relay switch 50 is still closed so that solenoid 54 of relay 48 is connected directly to lines 40 and 42. Thus, solenoid 54 is energized so that armature 47 is raised away from contact 56; therefore, solenoid 46 is deenergized and line 40 is connected through relay 46 to the pump motor 28. Furthermore, the solenoid of the bypass refrigerant valve 64 is deenergized and the solenoid of the water discharge valve 38 is deenergized both by virtue of contact 56 being disconnected from line 40. As the operation continues, the evaporator temperature drops, and relay switch 50 opens, but solenoid 54 remains energized because relay switch 52 is closed at this time so that it forms an interlock circuit for solenoid 54 through the upper contact 53 of relay switch 48 to line 40.

When ice of the desired thickness has been formed in the freezing tubes, water is diverted from the top of one or more of the freezing tubes onto bulb 76 so that relay switch 52 is opened. This deenergizes solenoid 54 so that its armature drops against contact 56. This connects line 40 through armature 47 to contact 56 and thence through line 62 to the solenoid of valve 64, with the result that this solenoid is energized and its valve is opened and hot refrigerant gas is supplied to the evaporator. As indicated above, this melts the ice bodies free so that they fall from the freezing tubes.

The dropping of armature 47 also connects line 40 through line 58 to the solenoid of the water discharge valve 38 with the result that this valve is opened. The dropping of armature 47 also energizes solenoid 68 of relay 46 but armature 45 is not lifted immediately, because of a time delay characteristic of this relay, whereby its armature is not lifted for a predetermined time after the energization of its solenoid. Therefore, the pump motor 28 continues to operate and water is still pumped upwardly through pipe 30. However, the opening of valve 36 diverts a portion of this water from valve 30 to a discharge drain. After the predetermined time, the armature 45 of relay 46 is lifted with the result that motor 28 is deenergized and water is no longer pumped upwardly through pipe 30. The passageway through valve 38 is adjustable, and the time delay characteristic of relay 46 is adjustable and these two functions are so adjusted that a predetermined amount of water flows through valve 38 through the discharge drain. If the predetermined amount of water is to be changed, the the opening through valve 38 may be changed or the time delay between the energization of solenoid 68, and the raising of armature 46 may be changed. As indicated above, a relatively constant quantity of ice is produced during each freezing operation and, therefore, it is possible to determine the amount of water to be discharged through valve 38 at the end of each freezing operation, to maintain an acceptable water condition in sump tank 20.

The raising of armature 45 connects line 40 through this armature, the upper contact and line 70 to the ice cutter motor 72 and, as disclosed more fully in the copending applications referred to above, this cuts the columns of ice in predetermined lengths to form ice cubes. When all of the ice has been discharged from the freezing tubes, the temperature of bulb 74 rises so that relay 49 is reclosed and, in the meantime, the flow of water over bulb 76 has been discontinued so that the temperature of this bulb is such that relay 52 is reclosed. Therefore, the circuit is restored to the condition of Figure 1, and the cycle is completed.

It has been indicated above that under some circumstances, it is desirable to discontinue the discharging of water from the sump tank, because such removal tends to cut down to some extent the rate of ice production. To effect this, line 58 is provided with a normally closed manual switch 60 which may be opened to prevent the energization of the solenoid of valve 38, and, therefore, this valve remains closed. Thus, the operator normally produces ice of exceptionally high quality, but when desirable, he increases the ice production with the understanding that the ice may be of inferior quality. However, it should be noted that by maintaining water of high quality within the tank, that the ice quality will not drop immediately upon the opening of switch 60 and the operator may therefore produce high quality ice at the increased rate for a short period of time.

Figure 2:
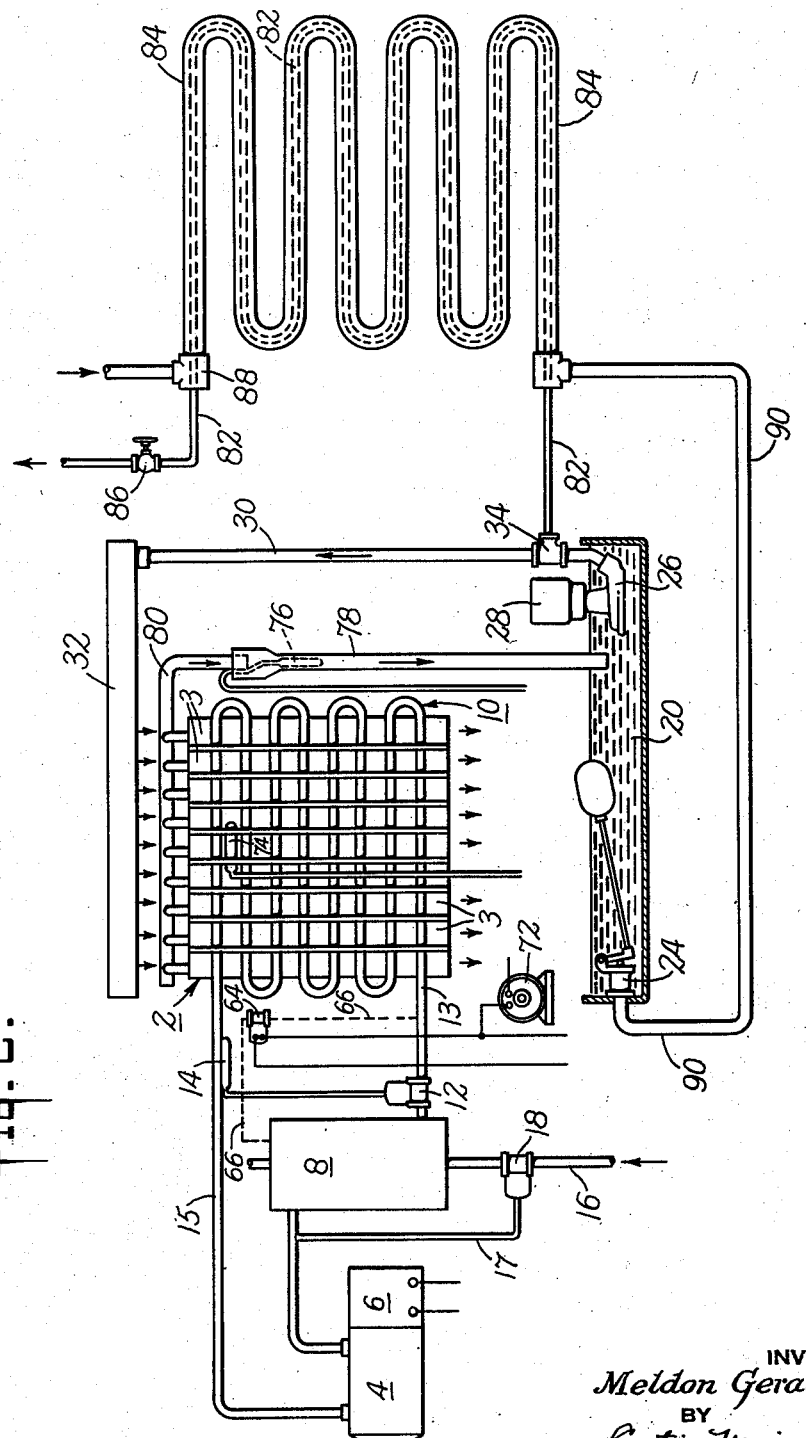
Figure 2 is a simplified showing similar to Figure 1, but showing another embodiment of the invention.

In the embodiment of Figure 2, water is withdrawn from the sump tank at a very low rate during the freezing operation, and this simplifies the mode of operation, and somewhat simplifies the construction. In Figure 2, the ice making structure as in Figure 1 and the control, is the same as in copending application, Serial No. 57,158, referred to above. However, in Figure 2 the water discharge solenoid valve is omitted, and has an added feature, the water being discharged is passed in heat exchange relationship with respect to the feed water passing to the sump tank. Referring to the right-hand portion of Figure 2, the T-connection 34 in pipe 30 has connected to it a relatively small pipe or tube 82 which extends through a pipe 84 and forms a heat exchanger therewith. Tube 82 emerges from pipe 84 and is provided with a manually adjustable outlet valve 86. The feed water passes into pipe 84 through a connection 88 and after flowing through pipe 84, it passes through a pipe 90 to valve 24. Tube 82 is of small diameter so that it offers substantial resistance to the flow of water therethrough. Therefore, during normal operation, there is a very small withdrawing of water to the drain. Furthermore, valve 86 may be adjusted to further restrict the flow and yet the opening through valve 86 may be large enough to avoid the possibility of the outlet becoming clogged.

During the freezing operation, pump 26 forces water up pipe 30 to header 32, and part of the water is diverted through tube 82 to the drain. The incoming feed water passes to the sump tank in countercurrent relationship with respect to the water in tube 82, and this avoids the normal loss of refrigeration which would otherwise accompany the discharging of water from the sump tank during the freezing operation. In this embodiment, the withdrawal of water may be completely stopped by manually closing valve 86.

Certain aspects of the present invention are applicable to continuous and intermittent congealing processes. It should be noted that the withdrawal of the water may be either continuous or intermittent. In accordance with one aspect of the invention, an aqueous solution is concentrated and withdrawn by the removal of substantially pure ice, and the intermittent or continuous addition of feed water or a dilute aqueous solution.

As many possible embodiments may be made of the mechanical features of the above invention and as the art herein described might be varied in various parts, all without departing from the scope of the invention, it is to be understood that all matter hereinabove set forth, or shown in the accompanying drawings is to be interpreted as illustrative and not in a limiting sense.

I claim:

1. In ice-making apparatus, the combination of, a plurality of vertical freezing tubes, refrigeration means to cool said tubes to a freezing temperature, means to circulate water through said tubes in amounts which are in excess of the amounts which are frozen whereby substantially pure water is frozen and water with increased solids concentrations is passed from the tubes, a discharge pipe connected to discharge a controlled portion of the water of increased solids concentrations, a solenoid valve controlling the flow of water through said pipe, and means to add additional water of lesser solids concentrations to the remaining water.

2. Apparatus as described in claim 1 wherein said means to circulate water includes, a pump, a pipe connected to receive water from said pump, and a sump tank within which said pump is positioned and to which water from said freezing tubes is returned, and wherein said discharge pipe is connected to receive water from said pump.

3. Apparatus as described in claim 2 which includes control means to operate said apparatus through successive freezing and harvesting operations and to operate said pump and open said solenoid valve during a portion of the harvesting operation.

4. Apparatus as described in claim 2 which includes, a heat exchange unit formed by said discharge pipe and a pipe through which feed water flows.

5. In ice making apparatus of the character described, the combination of, a freezing tube and evaporator assembly comprising a bank of vertical freezing tubes which are square in cross section and are in substantial alignment, a sump tank positioned beneath said tubes and adapted to collect water flowing from the bottoms of the tubes, water circulating means to pump water from said sump tank and to deliver it in substantial quantities to the tops of said tubes whereby the inner surfaces of the tubes are covered by fast flowing sheets of water part of which forms into ice and the remainder of which returns to said sump tank, a water discharge pipe for discharging water from said sump tank, a solenoid valve controlling the flow of water through said discharge pipe whereby a quantity of water of high solids concentration may be discharged and automatically replaced by make-up water, and control means to operate the apparatus through successive freezing and harvesting operations and to open said solenoid valve during a portion of the harvesting operation.

6. In ice-making apparatus of the type adapted to freeze uniformly high quality ice from water of varying solids content, the combination of a plurality of vertically disposed freezing tubes, said tubes being of square cross-section, a water supply header connected to the top of said tubes, refrigeration means adapted to cool the inner surfaces of said tube sufficiently to freeze water thereon, pump means for supplying water to be frozen to said header and thence to said inner tube surface, in an amount in excess of that which will be frozen thereon, whereby a portion of said water will be rejected by said freezing surfaces, a sump positioned below said freezing tubes to receive said excess water, water discharge means to discharge a predetermined amount of said rejected water, water supply means to add additional water of lesser solids concentrations to said sump, pipe means connecting said sump to said pump means to circulate the water from said sump to said header, and control means to operate said pump means and said water supply and discharge means through successive freezing and harvesting cycles.

7. Apparatus as described in claim 6, wherein said control means includes, means which is operative to start the harvesting operation and to simultaneously start a water discharge operation.

8. In ice-making apparatus, the combination of, ice freezing means presenting vertical freezing surface means upon which ice is frozen, a refrigeration system including an evaporator to cool said surface means to a freezing temperature, means to flow water over said surface means in amounts which are in excess of the amounts which are frozen including a pump which acts with the aid of gravity, whereby substantially pure water is frozen and water with increased solids concentrations is passed from said surface means, a discharge pipe connected to discharge a controlled portion of the water of increased solids concentrations, a solenoid valve controlling the flow of water through said pipe, means to add additional water of lesser solids concentrations to the remaining water, and control means to operate said apparatus through successive freezing and harvesting operations and to operate said pump and open said solenoid valve during a portion of the harvesting operation.

MELDON GERALD LEESON.

REFERENCES CITED

The following references are of record in the file of this patent:

UNITED STATES PATENTS

| Number | Name | Date |
|---|---|---|
| 519,359 | Taylor | May 8, 1894 |
| 1,437,518 | Hemphill | Dec. 5, 1922 |
| 1,931,347 | Gay | Oct. 17, 1933 |
| 1,963,842 | Gay | June 19, 1934 |
| 2,133,521 | Wussow et al. | Oct. 18, 1938 |
| 2,200,424 | Kubaugh | May 14, 1940 |
| 2,221,212 | Wussow | Nov. 12, 1940 |
| 2,253,512 | Fechner et al. | Aug. 26, 1941 |
| 2,310,468 | Short | Feb. 9, 1943 |